(12) United States Patent
Forstmann et al.

(10) Patent No.: US 9,020,969 B2
(45) Date of Patent: Apr. 28, 2015

(54) TRACKING QUERIES AND RETRIEVED RESULTS

(75) Inventors: Gerd Forstmann, Nussloch (DE); Stephan Muench, Karlsruhe (DE)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 13/181,530

(22) Filed: Jul. 13, 2011

(65) Prior Publication Data

US 2013/0018898 A1  Jan. 17, 2013

(51) Int. Cl.
G06F 17/30 (2006.01)

(52) U.S. Cl.
CPC .... G06F 17/30979 (2013.01); G06F 17/30516 (2013.01); G06F 17/30463 (2013.01)

(58) Field of Classification Search
CPC .......... G06F 17/30516; G06F 17/30286; G06F 17/30498; G06F 17/3053; G06F 17/30569; G06F 17/30445; G06F 17/30463; G06F 17/30477; G06F 17/30525; G06F 17/30548; G06F 17/30923; G06F 19/22
USPC ......... 707/1, 3, 752, 705, 713, 718, 736, 759, 707/762, 763, 768, 773, 779, 715, 769
See application file for complete search history.

(56) References Cited

U.S. PATENT DOCUMENTS

| | | | | |
|---|---|---|---|---|
| 7,567,962 | B2* | 7/2009 | Chakrabarti et al. | 707/999.007 |
| 7,634,477 | B2* | 12/2009 | Hinshaw | 700/2 |
| 7,702,610 | B2* | 4/2010 | Zane et al. | 707/999.001 |
| 7,996,388 | B2* | 8/2011 | Jain et al. | 707/718 |
| 8,037,040 | B2* | 10/2011 | Vemuri et al. | 707/702 |
| 8,140,586 | B2* | 3/2012 | Stolte et al. | 707/802 |
| 8,224,806 | B2* | 7/2012 | Al-Omari et al. | 707/713 |
| 8,229,923 | B2* | 7/2012 | Mirchandani et al. | 707/718 |
| 8,468,142 | B2* | 6/2013 | Stergiou et al. | 707/706 |
| 2010/0235362 | A1* | 9/2010 | Cormode et al. | 707/748 |
| 2010/0318538 | A1* | 12/2010 | Wyman et al. | 707/759 |
| 2011/0137917 | A1* | 6/2011 | Boland et al. | 707/747 |
| 2011/0314010 | A1* | 12/2011 | Ganti et al. | 707/728 |
| 2012/0047125 | A1* | 2/2012 | Day et al. | 707/714 |
| 2012/0173517 | A1* | 7/2012 | Lang et al. | 707/722 |

* cited by examiner

*Primary Examiner* — Jay Morrison
*Assistant Examiner* — Dangelino Gortayo (57) ABSTRACT

Various embodiments of systems and methods for tracking queries and retrieved results are described herein. In one aspect, a first query is associated with a first result set in a first tuple and a second query is associated with a second result set in a second tuple. The first result set is retrieved based on the execution of the first query and the second result set is retrieved based on the execution of the second query. The first and the second tuples are retained in a data structure in the order of execution of the respective queries. The retrieved result sets may be accessed forwards or backwards along the data structure without re-execution of the queries.

14 Claims, 11 Drawing Sheets

Inspect symbol table of program VER03074 by traversal

ASPath query: `//stp:*[@stp:name = 'A']` 910

[back to source selection] [previous result] [show result table] [execute] 950

☐ on selected line   navigation ID: [6] [navigate]  960

| CATEGORY 932 | ID 934 | TYPE 935 | SUBTYPE | SUBTYPENAME | NAME 938 | FULLNAME | LENGHT | DECIMALS |
|---|---|---|---|---|---|---|---|---|
| STP | 1.940 | 22 | 10 | ROLE_FIELD | A |  | 0 | 0 |
| STP | 1.963 | 12 | 57 | ROLE_CLASSTYPE | A |  | 0 | 0 |
| STP | 1.965 | 30 | 80 | ROLE_METHOD | A |  | 0 | 0 |
| STP | 1.971 | 31 | 80 | ROLE_METHOD | A |  | 0 | 0 |

FIG. 9A

Inspect symbol table of program VER03074 by traversal

ASPath query: `@stp:entry` 920

[back to source selection] [previous result] [show result table] [execute] 955

☐ on selected line   navigation ID: [6] [navigate]  970

| CATEGORY | ID | TYPE | SUBTYPE | SUBTYPENAME | NAME | FULLNAME | LENGHT | DECIMALS |
|---|---|---|---|---|---|---|---|---|
| STE | 1.876 | 11 | 4 | STC_DATA | A | \PR:VER03074\DA:A | 0 | 0 |
| STE | 1.886 | 11 | 45 | STC_TYPE | A | \PR:VER03074\TY:A | 0 | 0 |
| STE | 1.887 | 11 | 5 | STC_METHOD | A | \PR:VER03074\TY:A\ME:A | 0 | 0 |
| STE | 1.892 | 11 | 5 | STC_METHOD | A | \PR:VER03074\TY:A\ME:A | 0 | 0 |

FIG. 9B

Result  System  Help

*Inspect symbol table of program VER03074 by traversal*

ASPath query: [@ste:phenotype 1010]  [execute] ←1050
                                              1012
[back to source selection] [previous result] [show result table]

☑ on selected line
   1098
navigation ID: [7] [navigate]
                            1060

| CATEGORY | ID | TYPE | SUBTYPE | SUBTYPENAME | NAME | FULLNAME | LENGHT | DECIMALS |
|---|---|---|---|---|---|---|---|---|
| STE | 1.876 | 11 | 4 | STC_DATA | A | \PR:VER03074\DA:A | 0 | 0 |
| STE | 1.886 | 11 | 45 | STC_TYPE | A | \PR:VER03074\TY:A | 0 | 0 |
| STE | 1.887 | 11 | 5 | STC_METHOD | A | \PR:VER03074\TY:A\ME:A | 0 | 0 |
| STE | 1.892 | 11 | 5 | STC_METHOD | A | \PR:VER03074\TY:A\ME:A | 0 | 0 |

Result  System  Help

*Inspect symbol table of program VER03074 by traversal*

ASPath query: [@ste:phenotype 1010]  [execute]
                                     1080
[back to source selection] [previous result] [show result table]

☐ on selected line
navigation ID: [6] [navigate]
                            1070

| CATEGORY | ID | TYPE | SUBTYPE | SUBTYPENAME | NAME | FULLNAME | LENGHT | DECIMALS |
|---|---|---|---|---|---|---|---|---|
| STP | 1.940 | 22 | 10 | ROLE_FIELD | A | | 0 | 0 |

TRACKING QUERIES AND RETRIEVED RESULTS

TECHNICAL FIELD

The field relates generally to data processing and digital processing systems. More specifically, the field is related to tracking query execution and retrieved results within a distributed computer systems environment.

BACKGROUND

There are various ways for storing, organizing, or otherwise manipulating large amounts of data. Typically, representations of information are implemented as sets of entities that are related via associations, where entities of a given set share common attributes. Common example of representations of information is relational databases, where a table is a set of entities that have same attributes. Table rows represent entities, table columns represent attributes and tables are related to each other via foreign key associations. Another example is business objects, where a business object represents an entity with certain properties, i.e. attributes, and relates to other business objects.

Usually, subsets of data are retrieved and/or manipulated at a time, as working with an entire data collection at the same time may be unfeasible or inefficient, e.g., for performance reasons, technical limitations and the like. A common approach is using queries based on specific criteria to retrieve subsets of data to be further processed. An alternative approach is using iterators to access one entity at a time, such as a row cursor or an eXtensible Markup Language (XML) node iterator. Usually, the executed queries and the respective result sets retrieved based on the queries are not retained. The relation between a query and a corresponding result set, the execution order of the queries, e.g., the steps of queries execution determining how and in what order result sets are obtained, are not stored. In many cases, there is a need for analyzing result sets by inspecting the execution order of the respective queries.

SUMMARY

Various embodiments of systems and methods for keeping record of queries execution order and retrieved results are described herein. In one aspect, a first query is associated with a first result set in a first tuple and a second query is associated with a second result set in a second tuple. The first result set is retrieved based on the execution of the first query and the second result set is retrieved based on the execution of the second query. The first and the second tuple are retained in a data structure. In another aspect, the first and the second tuple are arranged in the data structure according to the order of execution of the first query and the second query.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for keeping record of queries execution order and retrieved results are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In computer systems, information result sets are retrieved following the execution of queries, e.g., database queries, an XML queries, etc. Often, a result set is manipulated and, as a consequence, it may change. The link between a query and the modified result set may be broken. From the modified data it cannot be inferred based on what query that data was retrieved. Often, there is a need to retain relations between queries and their corresponding result sets, even after the result sets have been altered.

Figure 1:
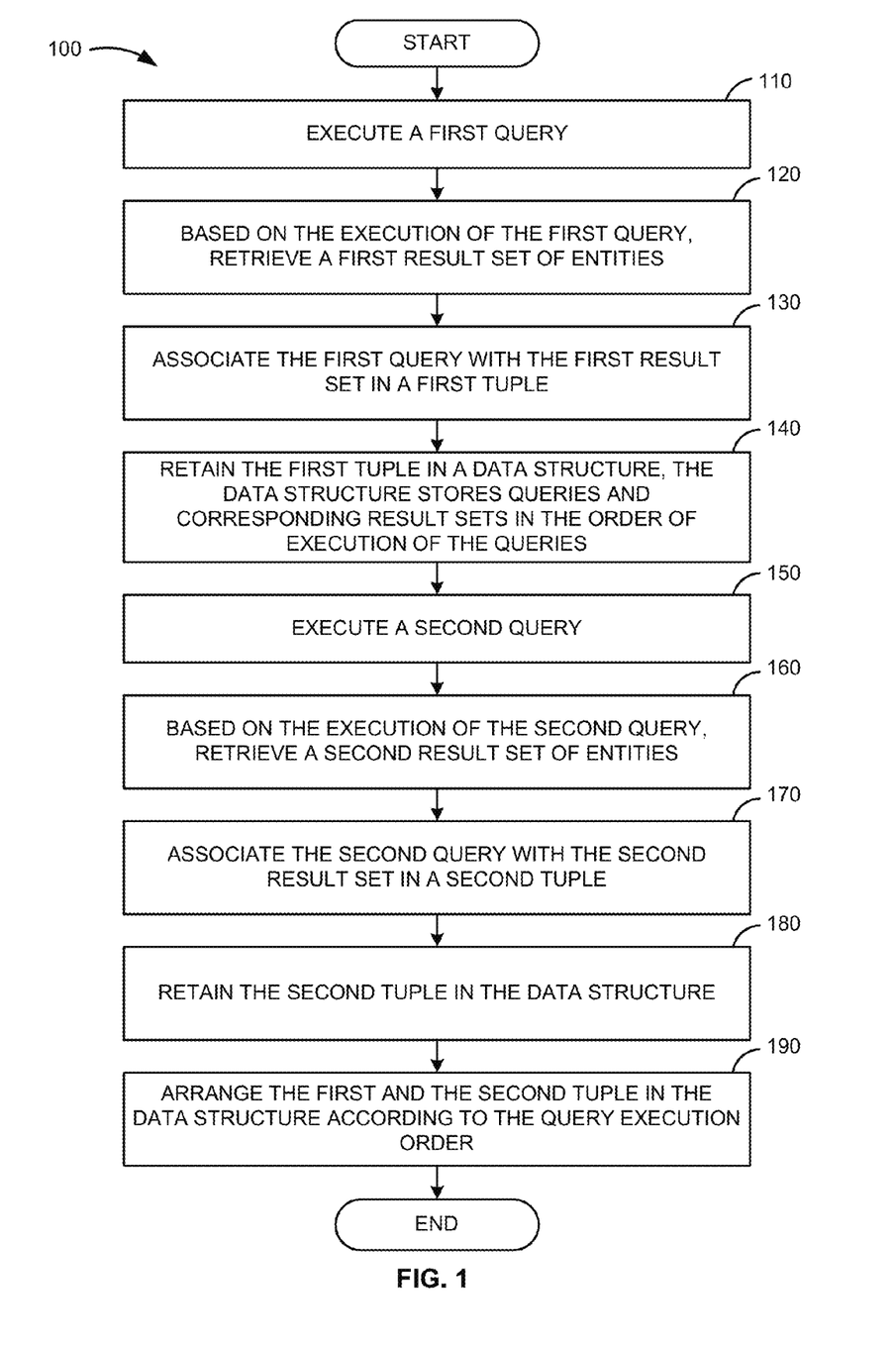
FIG. 1 illustrates a process for storing queries and results, according to one embodiment.

FIG. 1 shows process 100 for storing queries and results, according to one embodiment. The process starts at 110 with executing a first query. In this document, the term query addresses any command used to determine a subset of data, e.g., a result set. For example, queries may be described using Structured Query Language (SQL) developed by IBM Corp., XML Query (XQuery) language developed by World Wide Web Consortium (W3C), XML Path Language (XPath) query language developed by W3C, etc. A query may be, e.g., an Online Analytical Processing (OLAP) multi-dimensional analytical query. In one embodiment, queries may be used to extract data from databases, such as MaxDB® owned by SAP AG, Oracle® Database provided by Oracle Corporation, Microsoft SQL Server® developed by Microsoft Corp., and the like. Queries may be used to select data from information retrieval systems such as TREX® search engine provided by SAP AG. In other embodiments, queries may be used to query an XML document, a Word processing documents, or to query business objects in business object repositories.

In one embodiment, queries may be described using Abstract Syntax Tree path (ASPath) commands to retrieve data from an Abstract Syntax Tree (AST) or a Symbol Table (ST) of a program code. ASPath refers to SAP® AG proprietary internal query language for XPath like navigation in ASTs. A ST is a data structure, where identifiers of a program code are mapped or are associated with relevant metadata such as type, scope, size, address in the memory, etc. A ST is a data structure used by a compiler to keep track of semantics of identifiers used in a program. An AST is a tree representation of the abstract syntactic structure of a source code written in a programming language, where AST nodes represent constructs of the source code. Both the AST and the ST are internal data structures used by a compiler or an interpreter to organize and manipulate program code. Entries of a ST include identifiers and metadata of those identifiers. ST entries are associated with relevant AST nodes. The AST nodes represent constructs of the program code where the identifiers occur.

Referring back to FIG. 1, at 120, a first result set of entities is retrieved based on the execution of the first query. In one embodiment, a result set of entities may be organized in a database table, where table rows represent entities and table columns represent attributes that these entities share. Next, at 130, the first query is associated with the first result set in a first tuple. In this document, the term "tuple" means data structure combining a query and respective result set of entities as a discrete unit. Next, at 140, the first tuple is retained in a storage. In one embodiment, the storage keeps a number of queries and corresponding result sets as tuples, preserving the execution order of the queries.

At 150, a second query is executed. Based on the execution of the second query, a second result set of entities is retrieved at 160. Next, at 170, the second query is associated with the second result set of entities in a second tuple. At 180, the second tuple is retained in the storage. In one embodiment, the process ends at 190 with arranging the first and the second tuple in a data structure according to the query execution order. In one embodiment, the data structure may be, including but not limited to, a list of tuples, a graph structure, etc.

Figure 2:
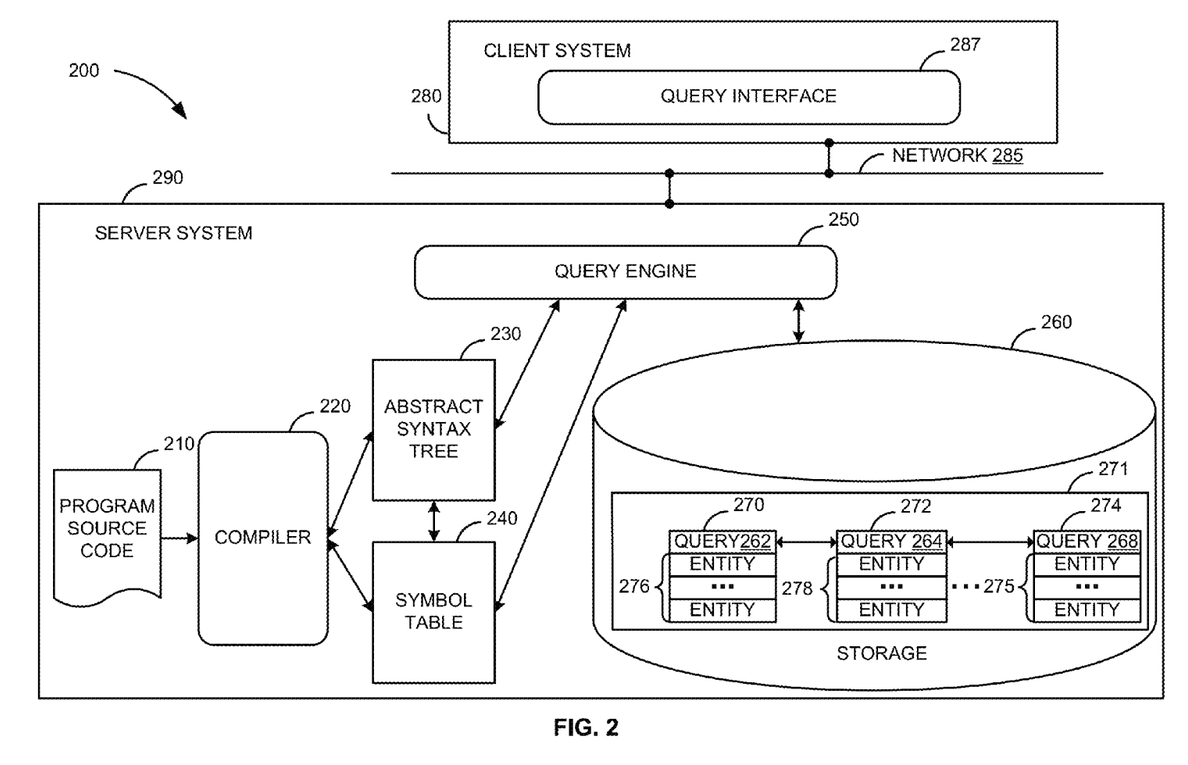
FIG. 2 illustrates a system for storing queries and corresponding result sets of entities, according to one embodiment.

FIG. 2 illustrates exemplary system 200 for storing queries and corresponding result sets of entities, where the queries are executed over an AST and a ST of a computer program code, according to one embodiment. System 200 includes client system 280 coupled to server system 290 through network 285, e.g. the Internet, intranet, or other public or private computer network. System 200 resembles simplified client-server computer environment architecture.

Client system 280 executes one or more computer applications, including but not limited to, user interfaces such as query interface 287. Client system 280 may include a browser or other client applications to interact with server system 290 via network 285. Query interface 285 may include one or more graphical user interface (GUI) elements used to receive queries, trigger queries execution and display query result sets.

Server system 290 includes, among other components, query engine 250. In one embodiment, query interface 287 is configured to interact with query engine 250. Query engine 250 may process queries received from query interface 287 to retrieve result sets of entities. The result sets may be returned to client system 280, e.g. to query interface 287 and displayed by the GUI elements. In one embodiment, processed queries and corresponding result sets of entities may be organized in data structure 271. For example, the processed queries 262, 264 and 268, and the result sets of entities 276, 278 and 275, retrieved based on the execution of the queries, may be retained in storage 260 and arranged in the data structure 271. In one embodiment, data structure 271 may be a linked list of tuples. For example, query 262 and result set of entities 276 are associated in tuple 270, query 264 and result set of entities 278 are associated in tuple 272, and query 268 and result set of entities 275 are associated in tuple 274, where tuples 270, 272 and 274 are organized in linked list data structure 271. Alternative embodiments may utilize other kinds of data structures.

The server system 290 further includes compiler 220 that translates program source code 210, i.e. a sequence of characters, into abstract syntax tree (AST) 230. Program source code 210 may be written in any programming language such as JAVA, C/C++/C#, ABAP, etc. Compiler 220 also creates symbol table (ST) 240 of identifiers used in the program source code 210. In one embodiment, ST 240 may be a hash table. Queries 262, 264 and 268 may include ASPath commands to query AST 230 and ST 240.

In one embodiment, queries 262, 264 and 268 and result set of entities 276, 278 and 275, may be organized in data structure 271 in their order of execution and retrieval. For example, if query 262 is processed first by query engine 250, tuple 270 is arranged as the first tuple of data structure 271. Accordingly, if query 264 is executed next, tuple 272 is arranged as second in data structure 271, and so on. Finally, if query 268 is executed last, then tuple 274 is ordered as last in data structure 271.

In FIG. 2, tuples in data structure 271 may be accessed via query interface 287. In one embodiment, a current query and a corresponding result set of entities may be displayed and accessed via query interface 287. An entity of a given result set of entities may be accessed via query interface 287, e.g. as a row iterator. Tuples 270, 272 and 274 may be displayed and accessed in parallel. Furthermore, result sets 276, 278 and 275 in data structure 271 are accessible without re-executing corresponding queries 262, 264 and 268.

In FIG. 2, system 200 is an exemplary system for tracking queries and result sets, according to one embodiment. Computing systems with structure different from the one illustrated with system 200 may be used as well for tracking queries and retrieved result sets of entities. For example, some of the components illustrated in server system 290 may be distributed across other systems communicating with each other via network 285. The program source code 210, compiler 220, AST 230, ST 240, query engine 250 and storage 260 may operate independently from each other and need not be necessarily integrated into a single system node. For example, storage 260 may be a back-end node such as database server. Compiler 220, query engine 250 and program source code 210 may be modules of a separate server node, or distributed across multiple systems. AST 230 and ST 240 may be persisted in storage 260 and/or in volatile memory of server system 290 (not illustrated). A specialist in the field would recognize that there are other possible variants for the architecture of system 200 corresponding to different embodiment.

Figure 3:
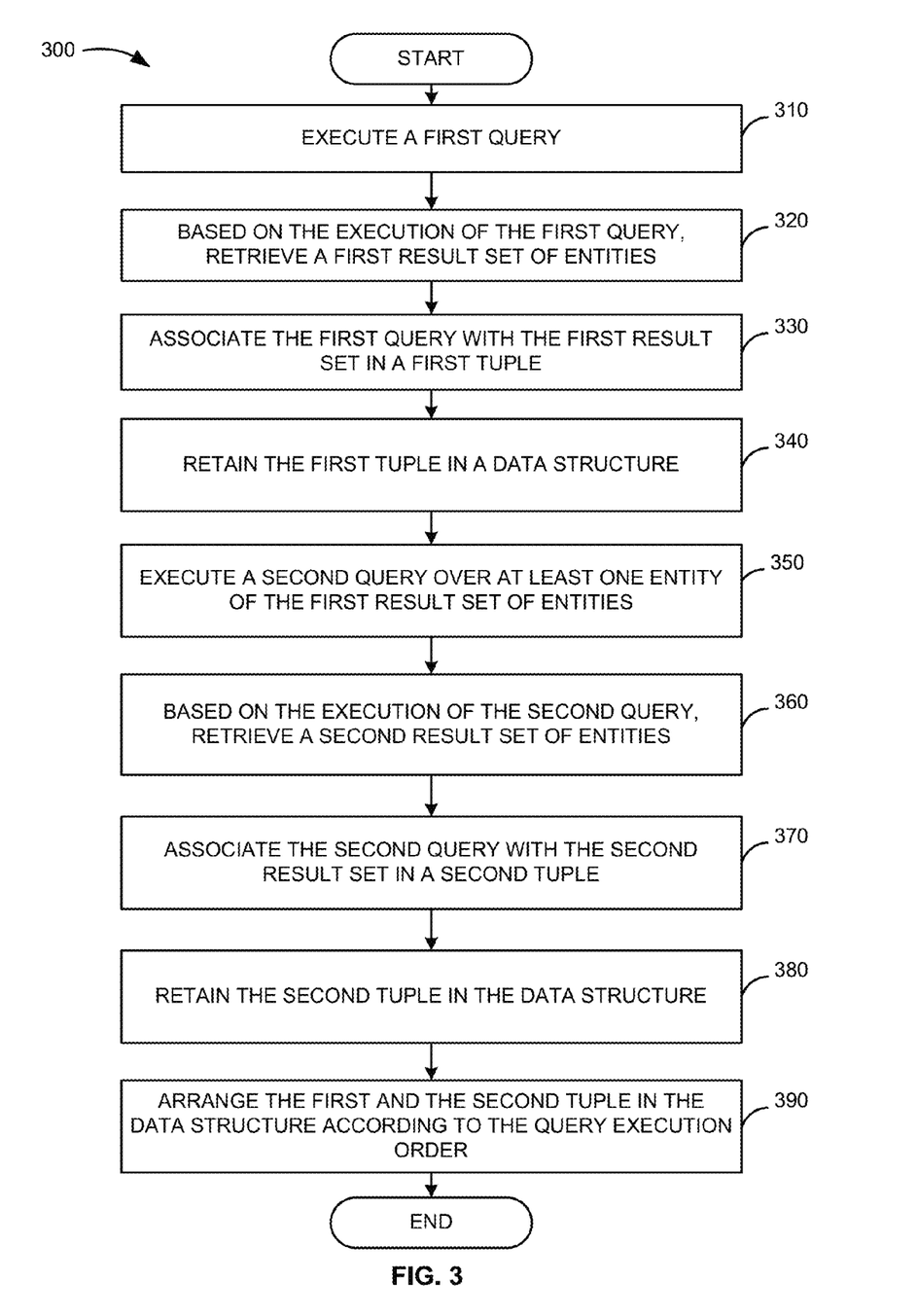
FIG. 3 illustrates a process for storing queries and results, where a query is executed over a result set retrieved based on the execution of another query, according to one embodiment.

FIG. 3 illustrates process 300 for storing queries and results, where one query is executed over one or more entities retrieved based on the execution of another query, according to one embodiment. The process starts at 310 with executing a first query. At 320, based on the execution of the first query, a first result set of entities is retrieved. At 330, the first query is associated with the first result set of entities in a first tuple. At 340, the first tuple is included in a data structure such as data structure 271, where the data structure arranges queries and result set as tuples, according to the order of execution of the queries.

The first result set of entities may be used as source data over which the second query is executed. At 350, a second query is executed over at least one entity of the first result set of entities. At 360, a second result set of entities is retrieved based on the execution of the second query over the at least one entity of the first result set. For example, in FIG. 2, query 262 may retrieve data for the variables used in a given method of program source code 210. Then, query 264 may retrieve variable types associated with the variables used in the method. Thus, result sets of preceding queries provide source data over which successive queries to be executed.

At 370, the second query is associated with the second result set of entities in a second tuple. At 380, the second tuple is included in the data structure. In one embodiment, the process ends at 390 with arranging the first and the second tuple in the data structure according to the query execution order.

In one embodiment, the data over which the second query is executed, i.e. the at least one entity of the first result set, may be used as source data for other subsequent queries as well. Thus, one result set of entities may be used as data over which one or more subsequent queries may be executed. For example, in case the second query is executed over the first result set of entities, a third query may be executed over the first result set as well. Accordingly, tuples may be arranged not in a linear sequence such as a linked list of tuples, but in a tree structure. For example, the first tuple may be the parent node in the formed tree data structure, while the second and the third tuples are parallel child nodes, e.g., child nodes at same sublevel of the data structure.

Figure 4:
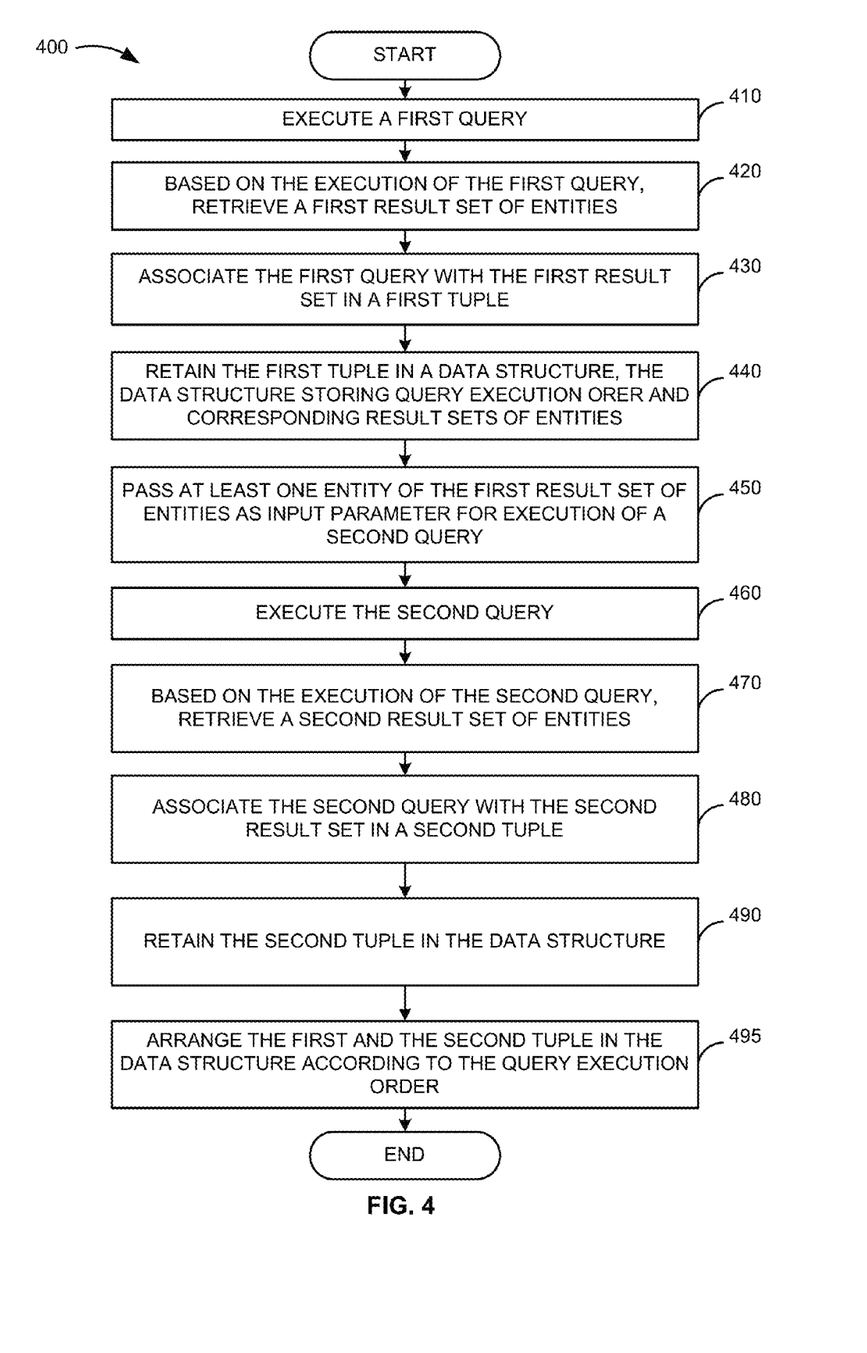
FIG. 4 illustrates a process for storing queries and results, where a result set is used as input parameter for a successive query, according to one embodiment.

FIG. 4 illustrates process 400 for storing queries and results, where at least one entity of a first result set is used as input parameter for the execution of a second query, according to one embodiment. The process starts at 410 with executing a first query. At 420, a first result set of entities is retrieved based on the execution of the first query. At 430, the first query is associated with the first result set of entities in a first tuple. At 440, the first tuple is retained in a data structure. The data structure arranges queries and corresponding result sets in the order of execution of the queries. In one embodiment, the data structure may be data structure 271. At 450, at least one entity of the first result set of entities is passed as input parameter for execution of a second query. For example, one or more values of one or more attributes retrieved via the first query may be used in the second query to determine a data scope.

At 460, the second query is executed. A second result set of entities is retrieved at 470 based on the execution of the second query, where the second query is built using one or more entities of the first result set. At 480, the second query is associated with the second result set of entities in a second tuple. At 490, the second tuple is retained in the data structure. In one embodiment, the process ends at 495 with arranging the first and the second tuple in the data structure according to the query execution order.

Figure 5:
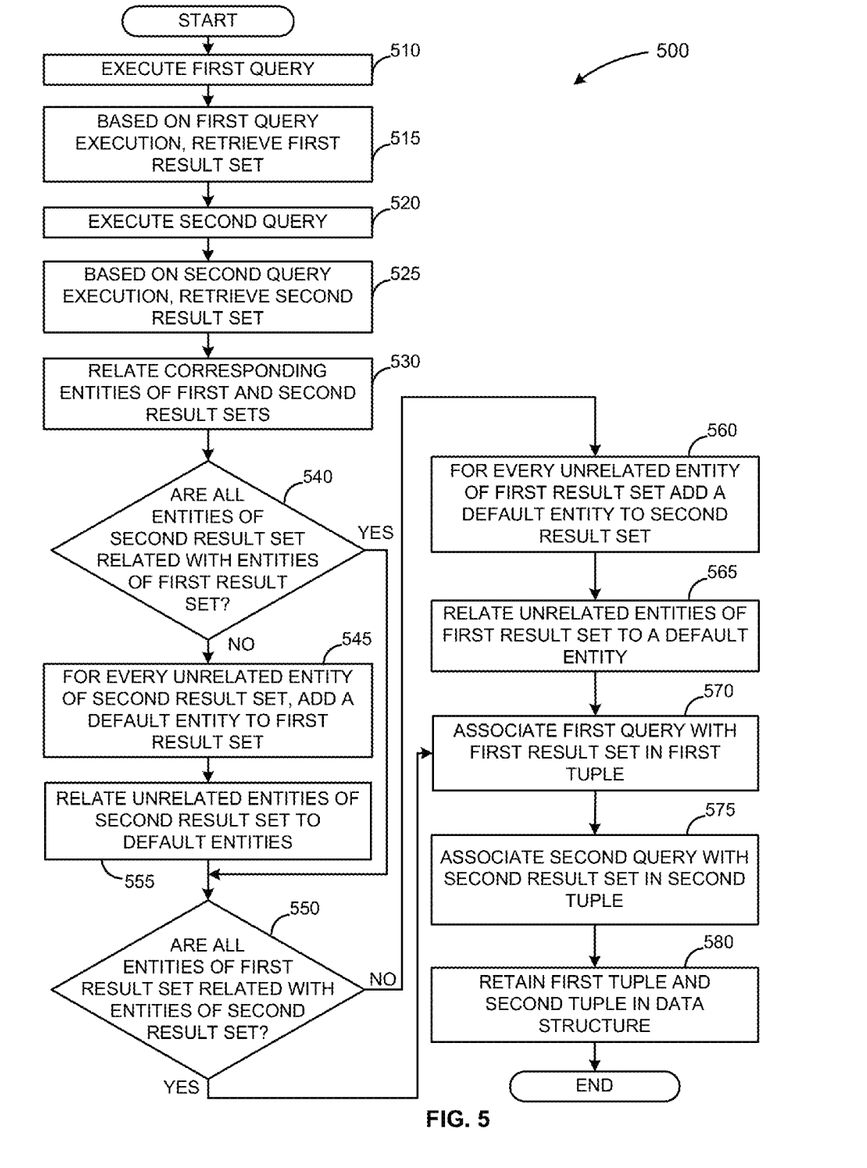
FIG. 5 illustrates a process for retaining relations between entities of a first result set with entities of a second result set, according to one embodiment.

FIG. 5 illustrates process 500 for retaining relations between entities of different result sets, according to one embodiment. The process starts at 510 with executing a first query. At 515, a first result set of entities is retrieved based on the execution of the first query. At 520 a second query is executed. At 525, a second result set of entities is retrieved based on the execution of the second query. The information entities of first and the second result sets of entities may be related, e.g. by a common attribute or property. For example, the first result set may include purchase orders data items of an Enterprise Resource Planning (ERP) system, and the second result set may include customers' details. Both results sets may share a customer identifier (ID) attribute, and the items of the two result sets may be related based on this attribute. Another example is relating identifiers included in a ST of a given program code to respective AST nodes that represent constructs of the code where the symbols occur. In one embodiment, an entity of the first result set may be related to more than one entity of the second result set and vice versa. For example, a customer may have more than one purchase orders. Thus, information details for that customer, included in a first result set, may be related to more than one purchase orders, included in a second result set.

At 530, corresponding entities of the first and the second result sets are related. At 540, a check is performed whether all entities of the second result set are related to entities of the first result set. If there are unrelated entities of the second result set, at 545, for every entity of the second result set that is not related to entity of the first result set, a default entity is added to the first result set. In one embodiment, a default entity may be a "null" entity. At 555, every unrelated entity of the second result set is related to a default entity. Otherwise, if all entities of the second result set are related to entities of the first result set in 540, a check is performed whether all entities of the first result set are related to entities of the second result set at 550. Similarly, if there are unrelated entities of the first result set, at 560, for every entity of the first result set that is not related to entity of the second result set, a default entity is added to the second result set. At 565, every unrelated entity of the first result set is related to a corresponding default entity of the second result set.

The process 500 continues at 570 with associating the first query with the first result set in a first tuple. At 575, the second query is associated with the second result set in a second tuple. At 580, the first and the second tuples are retained in a data structure. In the data structure tuples are arranged according to order of execution of the respective queries, e.g. as illustrated with data structure 271 in FIG. 2.

In one embodiment, the first and the second result sets may be related in one-to-one relationship. That is, for every entity of the second result set, there is one corresponding entity of the first result set. In case the first and the second result sets are related in one-to-one relationship, in one embodiment, the entities of the first and the second result sets are ordered in the respective tuples to correspond to the established relations between the entities. The order of the entities in the first and the second tuple match to the relations between the entities. Thus, relations between entities may be retained by ordering related entities in the tuples to correspond to each other. An example is given further below with reference to FIG. 9A-B and FIG. 10A-B.

In other embodiments, however, entities may be sorted or duplicate entities removed, e.g. retrieving only distinct entities. In such cases, the order of the entities in the first and the second tuple may not correspond to established relations between the entities.

Figure 6:
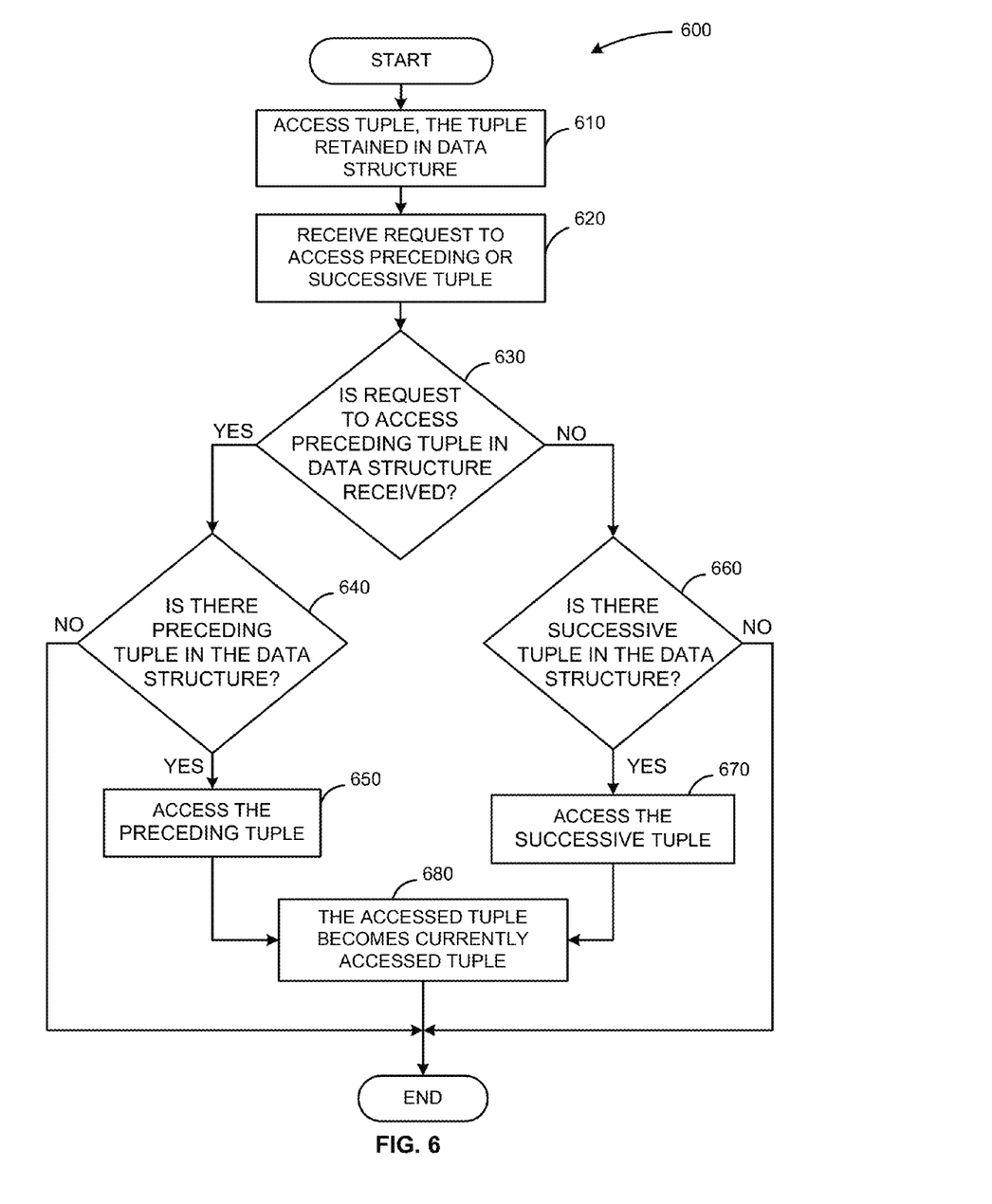
FIG. 6 illustrates a process for navigation between tracked queries and retrieved result sets, according to one embodiment.

FIG. 6 illustrates process 600 for navigation between tracked queries and retrieved result sets based on the execution order of the queries, according to one embodiment. The process starts at 610 with accessing a tuple, where the tuple is retained in a data structure. The data structure includes queries and corresponding result sets in the order of execution of the queries. In one embodiment, access to the tuple is granted in response to a user request. The tuple may be currently displayed or accessed as a result of the respective query execution.

At 620, a request for accessing preceding or successive tuple to the currently accessed tuple is received. The preceding or successive tuple are respectively ordered in the data structure. In one embodiment, the access request may be received via query interface 287 as illustrated in FIG. 2. At 630, a check is performed whether request for accessing a preceding tuple is received. If request to access a preceding tuple is received, at 640, a check is performed whether there is a preceding tuple retained in the data structure. If there is no preceding tuple, the process ends. Otherwise, at 650, the preceding tuple is accessed. At 680, the preceding tuple becomes the currently accessed tuple and the process ends. Thus, backwards access to tuples is enabled without the need of new execution of the preceding queries.

If request to access a preceding tuple is not received, at 630, then request for accessing successive tuple is received. At 660, a check is performed whether there is a successive tuple retained in the data structure. If there is no successive tuple, the process ends. Otherwise, at 670, the successive tuple is accessed. At 680, the successive tuple becomes the currently accessed tuple and the process ends. Thus, forward access to tuples is enabled without the need of new execution of the successive queries.

By moving forwards or backwards or otherwise navigating along the sequence of tuples retained in the data structure, the executed queries, the retrieved results and the existing relationships and dependencies may be analyzed without re-executing the respective queries. Furthermore, the order in which queries are executed and result sets retrieved may be analyzed as well.

In one embodiment, while navigating along the sequence of tuples retained in the data structure, only result sets of the respective tuples may be accessed and analyzed. In yet another embodiment, only queries may be accessed.

Back to FIG. 2, if tuple 272 is currently displayed or otherwise accessed, access to the preceding tuple in data structure 271, e.g., tuple 270 may be requested via query interface 287. In one embodiment, if the currently accessed tuple switches from tuple 272 to tuple 270, in response to a backward access request, tuple 272 may be kept in the data structure 271 on storage 260 or it may be no longer retained. In case tuple 272 is retained, it could be accessed from tuple 270 without re-execution of query 264 according to process 600, e.g. forward access. Thus, no re-execution of queries 262-269 is required when moving forwards or backwards along the sequence of tuples retained in data structure 271.

In one embodiment, as opposite to tracking and accessing tuples one by one, simultaneous access to a number of tuples retained in the data structure may be enabled. Accordingly, in other embodiments, simultaneous access to a number of queries or a number of result sets may be enabled.

Figure 7:
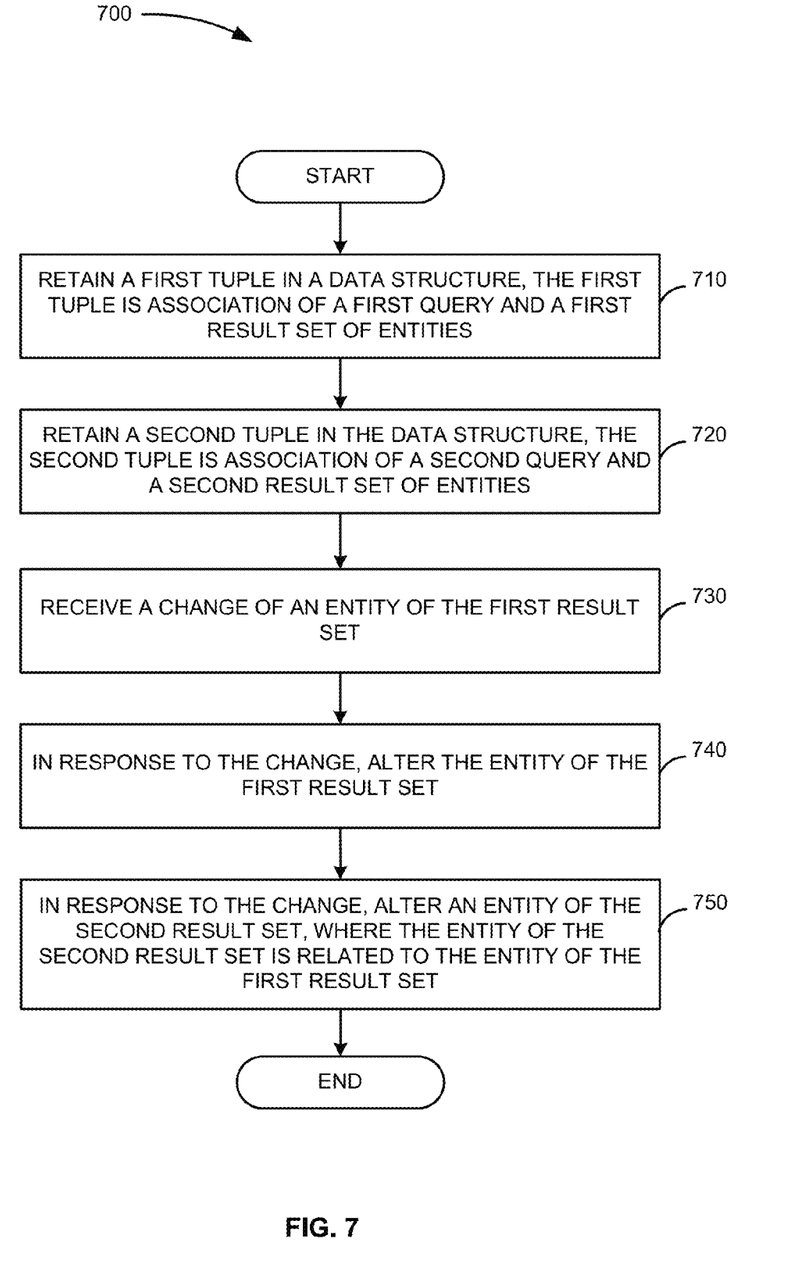
FIG. 7 illustrates a process for propagating changes in stored result sets of entities, according to one embodiment.

FIG. 7 shows process 700 for propagating changes in stored queries and corresponding result sets of entities, according to one embodiment. The process starts at 710 with retaining a first tuple in a data structure, where the first tuple includes a first query and a first result set of entities, retrieved based on the execution of the first query. Similarly, at 720, a second tuple is retained in the data structure, where the second tuple includes a second query and a second result set of entities, retrieved based on the execution of the second query. The tuples are arranged in the data structure according to the order of execution of the included queries.

At 730, a change of an entity of the first result set of entities is received. In one embodiment, a request for changing one or more entities of the first result set of entities may be received. For example, a user may change one or more attributes of one or more entities of a retrieved result set. Referring back to FIG. 2, all variables of a given method in ST 240 may be retrieved based on query 262, and one of the variables may be an array of type integer and length 10. The attributes type and length of the array may be changed via query interface 287. At 740, in response to the change at 730, the entity of the first result set is alerted. Furthermore, in response to the change at 730, the process 700 ends at 750 with altering an entity of the second result set of entities. In one embodiment, there is a relationship between the altered entity of the first result set and the consequently altered entity of the second result set. For example, the altered entities may share a common attribute that is changed. Thus, the change of the first result set is propagated in the second result set by changing the corresponding one or more related entities of the second result set.

For example, referring again to FIG. 2, all types of variables of a given method previously retrieved from ST 240 may be obtained based on an execution of a subsequent query, e.g., query 264 when the variables are retrieved based on the execution of query 262. Thus, in case the type of the retrieved array variable is changed, e.g., from integer to floating, the change may be reflected in result set 278 as well. In one embodiment, the change of a result set may be reflected not only by changing a related result sets, e.g, in the data structure 271, but also by changing the underlying data over which queries are executed, e.g. the data in ST 240 and AST 230 may be changed corresponding to a change in one or more of the result sets 275-278.

Figure 8:
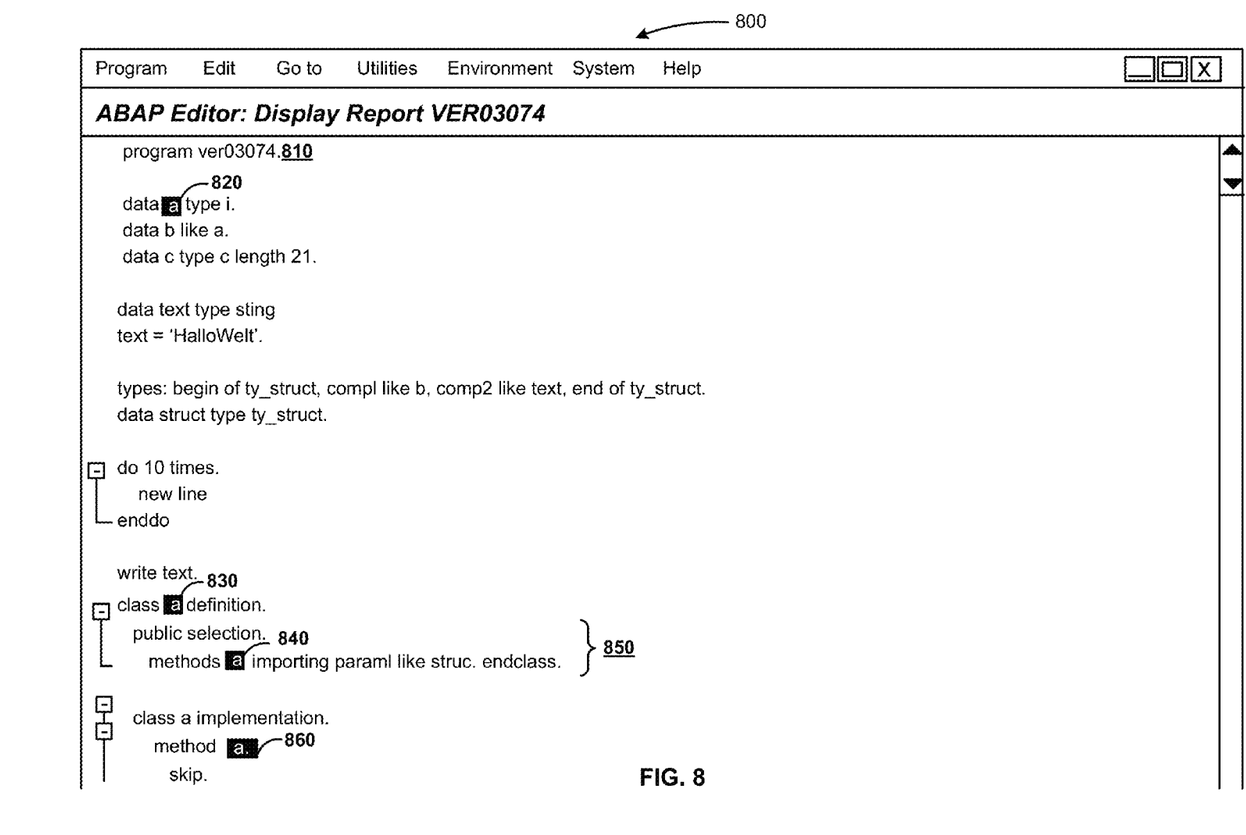
FIG. 8 shows exemplary data to be queried, according to one embodiment.

FIG. 8 shows exemplary program code listing 800 of an exemplary program "ver03074" referred to as program 810, where program 810 may be written in ABAP® programming language. A compiler or interpreter creates a ST and an AST of the code of program 810 to keep track of its syntactic and semantic structure, respectively. For example, referring back to FIG. 2, the program 810 may be part of program source code 210, and compiler 220 may analyze program 810 and generate ST 240 and AST 230 based on the structure of the code.

In one embodiment, program 810 may displayed in a graphical user interface (GUI), and parts of the program 810 may be selected for querying the generated ST and AST. For example, in FIG. 8, variable 820, i.e. data "a", is selected. Additionally, definition 850 of class 830, e.g., class "a", the corresponding declaration of method 840 (e.g. method "a" of class 830); and the respective implementation of method "a", i.e. method 860 are selected for querying the relevant ST and AST of the code. In one embodiment, queries for ST and AST may be written or generated as ASPath commands.

Figure 9A:
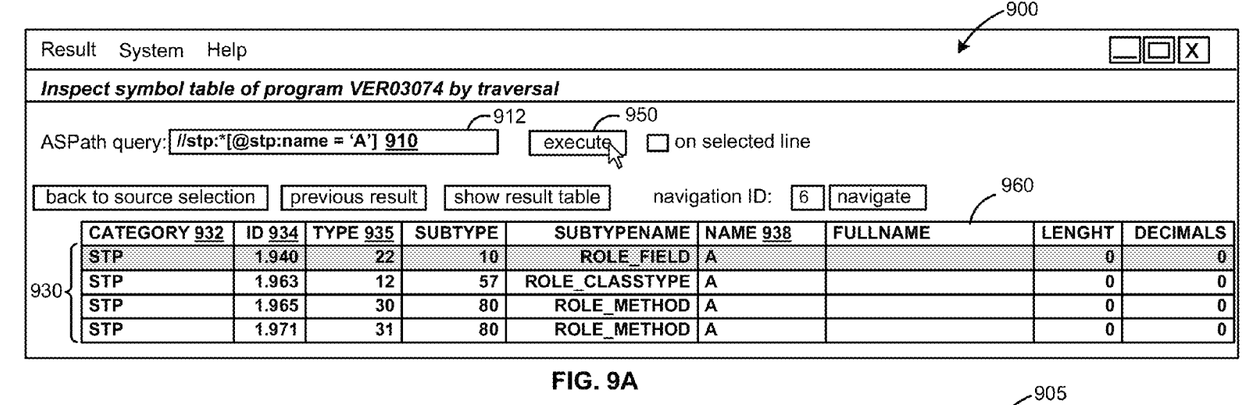
FIG. 9A shows a graphical user interface (GUI) screen including queries and results, where a first query is executed over a symbol table, according to one embodiment.

FIG. 9A is a graphical user interface diagram of GUI 900 showing queries and results, where a first query is executed over a symbol table of the program source code illustrated in FIG. 8. In one embodiment, GUI 900 may be query interface 287 (FIG. 2).

In one embodiment, a query 910 may be entered in field 912, where the queried data are the ST and the AST of sample program 810 (FIG. 8). In one embodiment, query 910 is written as a ASPath command:

//stp:*[@stp:name='A']

The query selects all entries, e.g., the symbol "*", with "name" attribute equals to "A", e.g., the "[@stp:name='A']" from namespace "stp", where "stp" stands for symbol table phenotypes. The same command written in SQL may have the following redaction:

SELECT*FROM Phenotypes WHERE name='A'

In these example queries "stp" and "Phenotypes" may correspond to symbol table (ST), abstract syntax tree (AST), or to both, and "name" may address identifier of a program, according to one embodiment.

There are different categories that group identifiers of a ST into different namespaces. Examples of namespaces include symbol table phenotypes ("stp") and symbol table entries ("ste"). Symbol table entries include identifiers and environment information for each identifier in a symbol table, where an environment groups a collection of identifiers. The relation between environments defines the relative visibility of the identifiers. "Phenotypes" provide additional semantic information about symbol table entries based on their category such as type information The execution of query 910 may be triggered via button "execute" 950, and result set of entities 930 is retrieved and displayed in result table 960. In the illustrated example result set 930 includes four entities represented as table rows of result table 960. The columns of table 960 represent attributes of the entities of the result set of entities 930. For example, CATEGORY, ID, TYPE, NAME, etc. are attributes or properties that the entities of the result set 930 share and these attributes are respectively represented by column 932, 934, 935 and 938. In one embodiment, the values of the attributes ID and TYPE are hardcoded.

Referring back to FIG. 8, query 910 selects one field with name "A", i.e. variable 820, one class with name "A", e.g., class 830 and two entities for method 'A', i.e. declaration of method "A" 840 and implementation of method "A" 860. In one embodiment, the first row is automatically selected as the current row, i.e. the first entity from the retrieved result set of entities. In other embodiments, a random entity, a subset of entities of the result set or the whole result set of entities may be selected as current rows.

Referring back to FIG. 1, the first query may be query 910 and the first result set of entities may be result set 930, where result set 930 is retrieved based on the execution of query 910. Furthermore, according to process 100, query 910 and result set 930 may be retained in a data structure, such as data structure 271 in FIG. 2, as a first tuple. The first tuple, e.g., tuple 270 in FIG. 2, associates query 910 and result set 930.

Figure 9B:
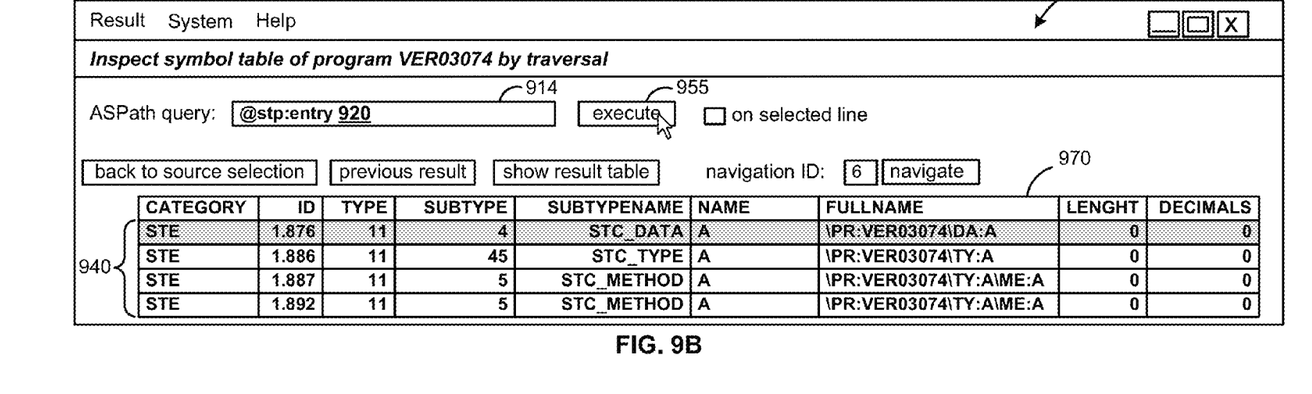
FIG. 9B shows a GUI screen including queries and results, where a second query is executed over a symbol table, according to one embodiment.

FIG. 9B is a graphical user interface diagram of GUI 905 showing queries and results, where a second query is executed over a symbol table of the sample program 810 illustrated in FIG. 8. Query 920 is entered in field 914, where the queried data are the ST and the AST of the program 810. In one embodiment, query 920 is written as ASPath query command:

@ stp:entry

In one embodiment, "stp", e.g., symbol table phenotypes, and the ST entries are associated in a one-to-one relationships. That is, for every symbol table phenotype there is a corresponding symbol table entry.

Referring back to FIG. 9B, the execution of query 920 may be triggered via button "execute" 955, and result set of entities 940 is retrieved and displayed in result table 970. Query 920 selects for each phenotype a corresponding associated entry. Result set 940 includes four entities, where the entities are represented as table rows of result table 970.

In one embodiment, referring back to FIG. 1, the second query may be query 920 and the second result set of entities may be result set 940, where result set 940 is retrieved based on the execution of query 920. According to process 100, query 920 and result set 940 may be retained in the data structure as a second tuple, such as tuple 272 in FIG. 2, associating query 920 and result set 940. Furthermore, the data structure arranges the first and the second tuple according to the query execution order. For example, since query 910 in FIG. 9A is executed first and query 920 in FIG. 9B is executed second, the tuple associating query 910 with result set 930 is arranged to precede the tuple associating query 920 with result set 940 in the data structure.

In one embodiment, referring back to FIG. 5, according to process 500, relations between the entities of result set 930 in FIG. 9A and the entities of result set 940 in FIG. 9B may be retained. For example, the entity in the first row of result table 960 may be related to the entity in the first row of result table 970, the entity in the second row of result table 960 may be related to the entity in the second row of result table 970, and so on.

Figure 10A:
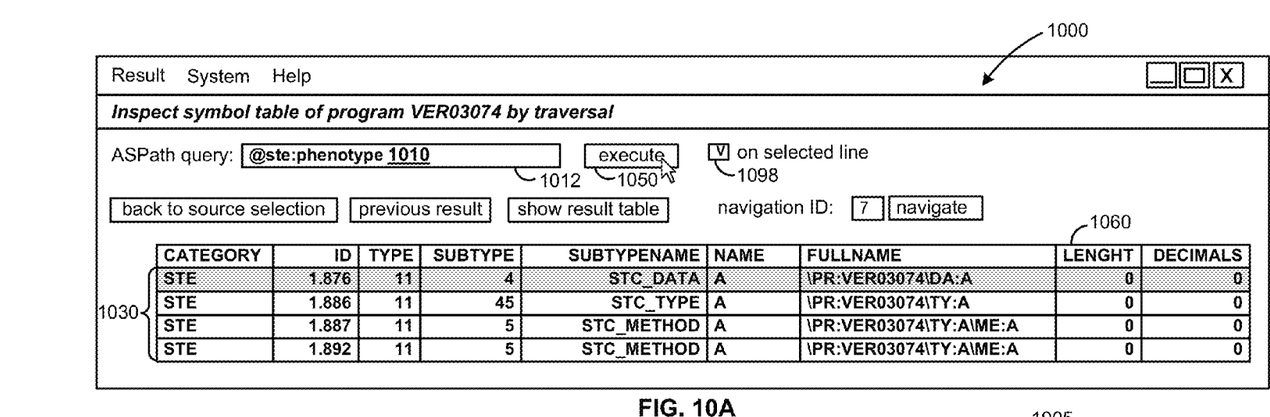
FIG. 10A shows a GUI screen including queries and results, where a query is executed over at least one entity of a result set of a previous query, according to one embodiment.
Figure 10B:
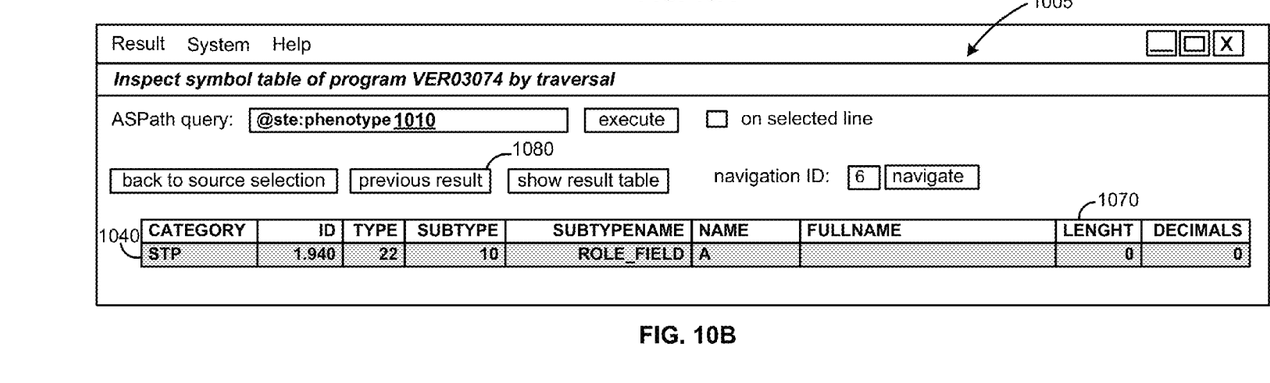
FIG. 10B shows a GUI screen including queries and results, where a query is executed over at least one entity of a result set of a previous query, according to one embodiment.

FIG. 10A and FIG. 10B show GUI 1000 and GUI 1005, respectively, including queries and results, where a query is executed over at least one entity of a result set of a previous query, according to one embodiment. After retrieving result set 940 (FIG. 9B), the scenario illustrated in FIG. 10A starts with entering query 1010 in field 1012, where the queried data are the ST and the AST of sample program 810 (FIG. 8). In one embodiment, query 1010 is written as ASPath command:

@stp: phenotype

In the illustrated example, the first row in result table 1060 is highlighted to mark it as selected, e.g., the first entity from the retrieved result set 1030 is the current entity. Result set 1030 is retrieved based on the execution of query 920 in FIG. 9B. A user may check checkbox 1098, e.g., "on selected line". Given that check box 1098 is ticked, a subsequent query would be executed over the selected entities, e.g. the entity in the first row of result table 1060. Thus, based on the execution of query 1010, e.g., triggered via button "execute" 1050, result set of entities 1040 is retrieved and displayed in result table 1070 in FIG. 10B. Based on the execution of query 1010 over the selected entity of result set 1030, the corresponding phenotype for the selected symbol table entry is retrieved.

Referring back to FIG. 3, according to process 300, the first query may be query 920 in FIG. 9B and the first result set of entities may be result set 940, where result set 940 is retrieved based on the execution of query 920. Query 920 is associated with result set 940 in a first tuple. Second query may be query 1010 in FIG. 10A, where query 1010 is executed over the selected entity in the first row of result table 970. Result set 1040 in FIG. 10B is retrieved based on the execution of query 1010 over the selected entity of result set 1030. Query 1010 is associated with result set 1040 in a second tuple. According to process 300, the first and the second tuples are retained in a data structure such as data structure 271 and arranged according to the execution order of query 920 and query 945.

In one embodiment, via clicking on button 1080 labeled "previous result", the previous query and the corresponding result set may be displayed, i.e. query 920 and result set 940. Thus, moving along, navigating or otherwise accessing retained queries and result sets may be accomplished without re-execution of the queries, according to one embodiment.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 11:
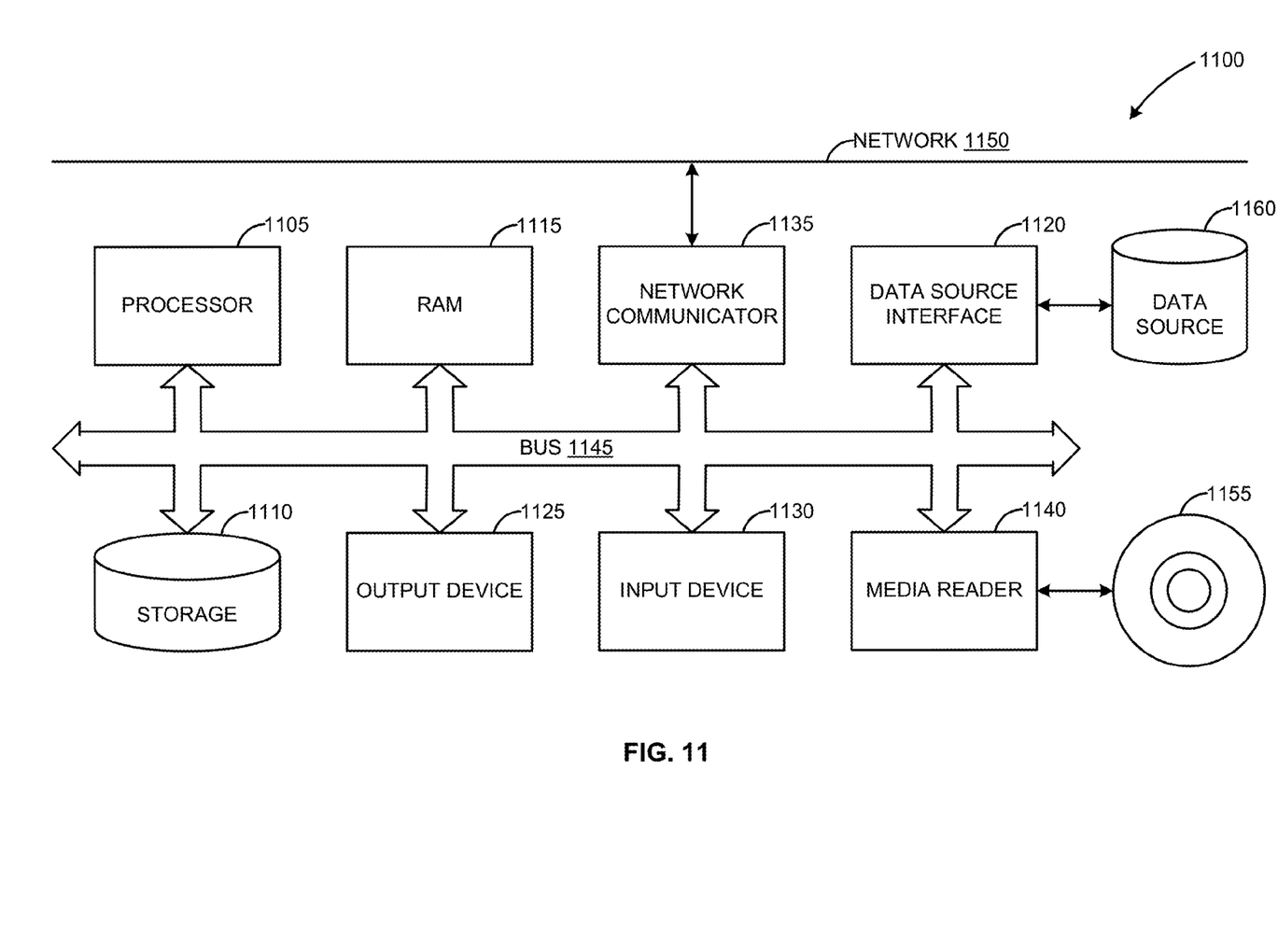
FIG. 11 is a block diagram of an exemplary computer system to track queries and retrieved results, according to one embodiment.

FIG. 11 is a block diagram of an exemplary computer system 1100. The computer system 1100 includes a processor 1105 that executes software instructions or code stored on a computer readable storage medium 1155 to perform the above-illustrated methods of the invention. The computer system 1100 includes a media reader 1140 to read the instructions from the computer readable storage medium 1155 and store the instructions in storage 1110 or in random access memory (RAM) 1115. The storage 1110 provides a large space for keeping static data where at least some instructions could be stored for later execution. The stored instructions may be further compiled to generate other representations of the instructions and dynamically stored in the RAM 1115.

The processor 1105 reads instructions from the RAM 1115 and performs actions as instructed. According to one embodiment of the invention, the computer system 1100 further includes an output device 1125 (e.g., a display) to provide at least some of the results of the execution as output including, but not limited to, visual information to users and an input device 1130 to provide a user or another device with means for entering data and/or otherwise interact with the computer system 1100. Each of these output devices 1125 and input devices 1130 could be joined by one or more additional peripherals to further expand the capabilities of the computer system 1100. A network communicator 1135 may be provided to connect the computer system 1100 to a network 1150 and in turn to other devices connected to the network 1150 including other clients, servers, data stores, and interfaces, for instance. The modules of the computer system 1100 are interconnected via a bus 1145. Computer system 1100 includes a data source interface 1120 to access data source 1160. The data source 1160 can be accessed via one or more abstraction layers implemented in hardware or software. For example, the data source 1160 may be accessed by network 1150. In some embodiments the data source 1160 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method to track a plurality of queries and a plurality of result sets of entities, the method comprising:
storing in a memory of a computer, as a first tuple, a first query of said plurality of queries and a first result set of said plurality of result sets, wherein the first result set is determined based on an execution of the first query over a symbol table of program source code and the first result set comprises one or more entries including one or more identifiers used in the program source code, and the first tuple is associating the first query with the corresponding first result set;
storing in the memory, as a second tuple, a second query of the plurality of queries and a second result set of the plurality of result sets, wherein the second result set is determined based on an execution of the second query over the symbol table of the program source code and the second result set comprises metadata associated with the one or more identifiers retrieved by the first query and the second tuple is associating the second query with the corresponding second result set;
retaining the first tuple and the second tuple in a data structure according to an order of execution of the first query and the second query; and
navigating between the ordered first and second tuple to access multiple times at least one of the first and the second tuple.

2. The method of claim 1 further comprising:
passing at least one identifier from the one or more identifiers of the first result set as input parameter for execution of the second query.

3. The method of claim 1 further comprising:
receiving a change of metadata of the second result set, wherein the metadata associated with at least one identifier from the one or more identifiers of the first result set in the first tuple; and
altering the at least one identifier from the first result set in the second tuple in response to the change.

4. The method of claim 1, wherein retaining the first tuple and the second tuple in the data structure according to the order of execution comprises:
establishing a relation between an identifier from the one or more identifiers of the first result set with metadata of the second result set.

5. The method of claim 1 further comprising:
accessing the second tuple in the data structure in response to a data access request; and
accessing the first tuple in the data structure in response to a navigation request.

6. A computer system for storing a plurality of queries and corresponding plurality of result sets of entities, the system including:
a memory storing program code; and
at least one processor coupled with the memory to execute the program code related to:
a first tuple comprising an association between a first query from the plurality of queries and a corresponding first result set of entities from the plurality of result sets of entities, wherein the first query and the corresponding first result set of entities are stored as the first tuple in a memory of the computer and the first result set of entities is determined based on an execution of the first query over a symbol table of program source code and the first result set of entities includes one or more identifiers used in the program source code,
a second tuple comprising an association between a second query of the plurality of queries and a corresponding second result set of entities of the plurality of result sets of entities, wherein the second query and the corresponding first result set of entities are stored as the second tuple in the memory of the computer and the second result set of entities is determined based on an execution of the second query over the symbol table of the program source code and the second result set of entities comprises metadata associated with the one or more identifiers retrieved by the first query, and
a data structure storing the first tuple and the second tuple according to order of execution of the first query and the second query.

7. The computer system of claim 6, wherein the second query receives at least one identifier from the one or more identifiers of the first result set of entities as input parameter for execution of the second query.

8. The computer system of claim 6, wherein the data structure stores a relation between an identifier from the one or more identifiers of the first result set of entities and metadata of the second result set of entities.

9. The computer system of claim 8, further comprising a default entity added to the second result set of entities to form the relation.

10. The computer system of claim 6, wherein at least one entity of the second result set of the second tuple is altered in response to a change of at least one identifier from the one or more identifiers of the first result set of the first tuple, wherein the at least one entity of the second result set of entities comprises metadata associated with the at least one identifier of the first result set.

11. The computer system of claim 6, wherein the memory storing instruction that when executed by the at least one processor generate a GUI comprising:
a data entry field to receive a query of the plurality of queries; and
a window to display a result set of the plurality of result sets, wherein the result set is retrieved based on an execution of the query.

12. A non-transitory computer readable medium comprising instructions stored thereon, which when executed by a computer, cause the computer to:
store, as a first tuple, a first query of a plurality of queries, wherein the first query retrieves one or more entries from a symbol table of program source code, and a first result set of a plurality of result sets, wherein the first result set is determined based on an execution of the first query over the symbol table and comprises the one or more entries including one or more identifiers used in the program source code and the first tuple is associating the first query with the corresponding first result set;
select at least one entry from the one or more entries from the first result set as input to a second query from the plurality of queries;
store, as a second tuple, the second query, wherein the second query retrieves metadata associated with at least one identifier included in the selected at least one entry from the first result set, and a second result set of the plurality of result sets, wherein the second result set is determined based on an execution of the second query over the symbol table of the program source code and comprises the metadata associated with at least one identifier included in the selected at least one entry from the first result set and the second tuple is associating the second query with the corresponding second result set;

retain the first tuple and the second tuple in a data structure according to an order of execution of the first query and the second query; and navigate between the ordered first and second tuple to access multiple times at least one of the first and the second tuple.

13. The non-transitory computer readable medium of claim 12 comprising instructions stored thereon which when executed by the computer, cause the computer further to:

change the metadata associated with at least one identifier included in the selected at least one entry of the second result set in the second tuple; and alter the at least one entry of the first result set in the first tuple in response to the change.

14. The non-transitory computer readable medium of claim 12 comprising instructions stored thereon which when executed by the computer, cause the computer further to:

in response to a navigation request, access one or more of a preceding or a successive tuple of a currently accessed tuple in the data structure.

* * * * *